(12) United States Patent
Chaiken et al.

(10) Patent No.: US 10,108,485 B2
(45) Date of Patent: Oct. 23, 2018

(54) METHOD FOR AUTOMATIC CORRECTION OF NONVOLATILE MEMORY IN INFORMATION HANDLING SYSTEMS

(71) Applicant: Dell Products L.P., Round Rock, TX (US)

(72) Inventors: Craig Lawrence Chaiken, Pflugerville, TX (US); Balasingh Ponraj Samuel, Round Rock, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/380,242

(22) Filed: Dec. 15, 2016

(65) Prior Publication Data

US 2018/0173587 A1 Jun. 21, 2018

(51) Int. Cl.
*G11C 29/00* (2006.01)
*G06F 11/10* (2006.01)
*G06F 3/06* (2006.01)
*G06F 9/4401* (2018.01)

(52) U.S. Cl.
CPC .............. *G06F 11/10* (2013.01); *G06F 3/065* (2013.01); *G06F 3/0619* (2013.01); *G06F 3/0688* (2013.01); *G06F 9/4401* (2013.01); *G06F 11/106* (2013.01)

(58) Field of Classification Search
None
See application file for complete search history.

(56) References Cited

U.S. PATENT DOCUMENTS

| | | | | |
|---|---|---|---|---|
| 5,901,310 A * | 5/1999 | Rahman | ................ | G06F 9/4401 713/1 |
| 7,716,414 B2 * | 5/2010 | Slyz | ......................... | G06F 8/68 711/103 |
| 7,934,209 B2 * | 4/2011 | Zimmer | ................ | G06F 9/4401 711/103 |
| 2003/0126511 A1 * | 7/2003 | Yang | ..................... | G06F 9/4401 714/39 |

* cited by examiner

*Primary Examiner* — Daniel McMahon
(74) *Attorney, Agent, or Firm* — Baker Botts L.L.P.

(57) ABSTRACT

A method for automatic correction of nonvolatile memory in information handling systems includes storing ECC data for a compressed BIOS firmware. The ECC data are used to identify and correct error bits in the compressed BIOS firmware. The discovered error bits are recorded in the nonvolatile memory and accessed for a faster correction method for the compressed BIOS firmware than using the ECC data on subsequent attempts.

18 Claims, 4 Drawing Sheets

METHOD FOR AUTOMATIC CORRECTION OF NONVOLATILE MEMORY IN INFORMATION HANDLING SYSTEMS

BACKGROUND

Field of the Disclosure

This disclosure relates generally to information handling systems and, more particularly, to a method for automatic correction of nonvolatile memory in information handling systems.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic/input output system (BIOS) and an embedded controller (EC) may include respective firmware for various hardware management tasks. Broadly speaking, an embedded controller may be a device, system, or apparatus for remote monitoring or management of an information handling system. The embedded controller may be a secondary information handling system embedded in the information handling system. This secondary information handling system, in the form of the embedded controller, may include additional functionality. In many information handling systems having an integrated display, such as laptops, notebooks, netbooks, tablets, mobile telephones, 2-in-1 systems, all-in-one systems, among others, the embedded controller may have access to a nonvolatile memory that stores a BIOS firmware for execution prior to booting. The BIOS firmware may be subject to malicious attacks that compromise the security of an information handling system. Even when the BIOS firmware stored in the nonvolatile memory is not subject to malicious attacks, physical degradation of the nonvolatile memory can corrupt the BIOS firmware and render the information handling system unbootable, which is undesirable.

SUMMARY

In one aspect, a disclosed method is for correcting nonvolatile memories in information handling systems. The method may include determining whether a BIOS firmware stored in compressed form on a nonvolatile memory of an information handling system is decompressible. If the BIOS firmware is not decompressible, the method may include copying the BIOS firmware in compressed form to a system memory of the information handling system, identifying and correcting error bits in the BIOS firmware in the system memory using error correction codes (ECC) stored on the nonvolatile memory for the BIOS firmware, recording the error bits identified from the BIOS firmware in the nonvolatile memory, and decompressing the BIOS firmware in the system memory using the error bits identified.

In any of the disclosed embodiments, the method may further include, prior to determining whether the BIOS firmware is decompressible, determining whether any error bits for the BIOS firmware are recorded in the nonvolatile memory. If error bits for the BIOS firmware are recorded in the nonvolatile memory, the method may include copying the BIOS firmware in compressed form to the system memory, and identifying and correcting error bits in the BIOS firmware in the system memory using the recorded error bits stored on the nonvolatile memory for the BIOS firmware.

In any of the disclosed embodiments, the method may further include, if the BIOS firmware is decompressible, decompressing and executing the BIOS firmware from the system memory, and booting the information handling system.

In any of the disclosed embodiments, the method may further include, while the information handling system is operating after the booting, determining whether the BIOS firmware is decompressible using the recorded error bits. In the method, if the BIOS firmware is not decompressible using the recorded error bits, sending a notification to a user of the information handling system that the information handling system is not rebootable, copying the BIOS firmware in compressed form to the system memory, identifying and correcting new error bits in the BIOS firmware in the system memory using the ECC, and recording the new error bits in addition to the recorded error bits in the nonvolatile memory.

In any of the disclosed embodiments, the method the BIOS firmware may comply with a Unified Extensible Firmware Interface (UEFI) standard, while the BIOS firmware may include code to execute a driver execution environment (DXE) and a system management mode (SMM).

Other disclosed aspects include an embedded controller (EC) for correcting nonvolatile memories in information handling systems comprising an EC processor in an information handling system including a primary processor different from the EC processor, the EC processor having access to a nonvolatile memory storing instructions executable to perform the method, as well as a non-transitory computer readable nonvolatile memory storing instructions executable by the EC processor to perform the method.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

As noted previously, certain information handling systems may include BIOS firmware stored on a nonvolatile memory of an embedded controller (EC). Because the nonvolatile memory may experience physical degradation of memory cells, such as thermal degradation over time, the BIOS firmware may become corrupted and unusable, which may render the information handling system unusable and unbootable.

As will be described in further detail, the inventors of the present disclosure have discovered a method and system for automatic correction of nonvolatile memory in information handling systems. The methods and systems disclosed herein for automatic correction of nonvolatile memory in information handling systems may use error correction codes (ECC) to correct a corrupted version of the BIOS firmware. The methods and systems disclosed herein for automatic correction of nonvolatile memory in information handling systems may apply ECC to a compressed version of the BIOS firmware that is stored on the nonvolatile memory. The methods and systems disclosed herein for automatic correction of nonvolatile memory in information handling systems may further record error bits for the compressed version of the BIOS firmware in the nonvolatile memory, in order to facilitate faster checking and correction of the BIOS firmware than ECC methods. The methods and systems disclosed herein for automatic correction of nonvolatile memory in information handling systems may provide for continuous monitoring of the compressed BIOS firmware for errors, even when the information handling system has booted and is operating, in order to prevent an unbootable condition from occurring.

Particular embodiments are best understood by reference to FIGS. 1, 2, 3, and 4 wherein like numbers are used to indicate like and corresponding parts.

Figure 1:
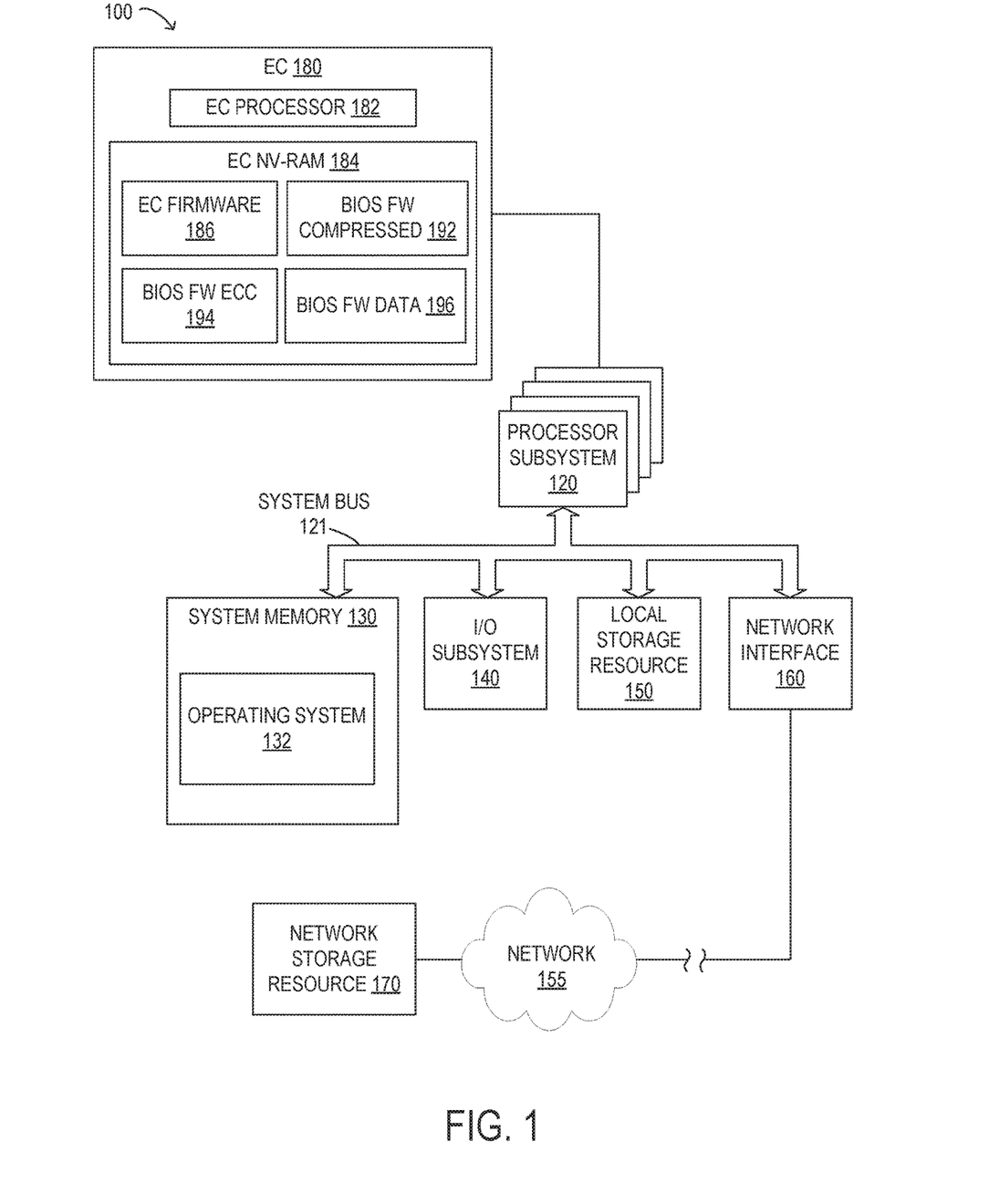
FIG. 1 is a block diagram of selected elements of an embodiment of an information handling system.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, system memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and/or execute program instructions and process data. In some embodiments, processor subsystem 120 may interpret and execute program instructions and process data stored locally (e.g., in system memory 130 or another component of physical hardware 102). In the same or alternative embodiments, processor subsystem 120 may interpret and/or execute program instructions and/or process data stored remotely (e.g., in a network storage resource).

Also in FIG. 1, system memory 130 may comprise a system, device, or apparatus operable to retain and/or retrieve program instructions and/or data for a period of time (e.g., computer-readable media). As shown in the example embodiment of FIG. 1, system memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 System memory 130 may comprise random access memory (RAM), electrically erasable programmable read-only memory (EEPROM), a PCM-CIA card, flash memory, magnetic storage, opto-magnetic storage, or a suitable selection or array of volatile or nonvolatile memory that retains data after power to its associated information handling system, such as information handling system 100, is powered down. In the exemplary embodiments disclosed below herein, it may be assumed that system memory comprises volatile RAM.

Local storage resource 150 may comprise computer-readable media (e.g., hard disk drive, floppy disk drive, CD-ROM, and/or other type of rotating storage media, flash memory, EEPROM, or another type of solid state storage media) and may be generally operable to store instructions and data. For example, local storage resource 150 may store executable code in the form of program files that may be loaded into system memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and peripheral interfaces. In certain embodiments, I/O subsystem 140 may provide access to a touch panel or a display adapter.

Also shown in FIG. 1 is embedded controller (EC) 180, which may include EC processor 182 as a second processor included with information handling system 100 for certain management tasks. EC processor 182 may have access to EC non-volatile random access memory (NV-RAM), which may store EC firmware 186, representing instructions executable by EC processor 182 to perform various aspects of the methods disclosed herein. Also shown stored in EC NV-RAM 184 is BIOS FW (firmware) compressed 192, often simply or collectively referred to as the 'BIOS'. BIOS FW compressed 192 may represent pre-boot instructions executable by processor subsystem 120, for example, for preparing information handling system 100 to boot by activating various hardware components in preparation of launching operating system 132 for execution. It is noted that BIOS FW compressed 192 refers to a compressed version of the BIOS FW that is executable by processor subsystem 120 and is obtained by decompressing BIOS FW compressed 192. In certain embodiments, BIOS FW compressed 192 includes a Unified Extensible Firmware Interface (UEFI) according to a specification promulgated by the UEFI Forum (uefi.org). The UEFI included with BIOS FW compressed 192 may include code to execute a driver execution environment (DXE) and a system management mode (SMM). Also shown stored in EC NV-RAM 184 is BIOS FW ECC 194, which stores ECCs for BIOS FW compressed 192, as well as BIOS FW data 196.

Embedded controller 180 may execute EC firmware 186 on EC processor 182 even when other components in information handling system 100 are inoperable. Furthermore, embedded controller 180 may include a communication interface (not shown), such as a network interface or a local input/output interface to communicate with other elements of information handling system 100.

In operation, when information handling system 100 is powered on, EC firmware 186 may be launched and may execute code for automatic correction of EC NV-RAM 184. EC firmware 186 may include specific code for error checking BIOS FW compressed 192, such as by using BIOS FW ECC 194. When the error checking using BIOS FW ECC 194 identifies error bits in BIOS FW compressed 192, the error bits may be recorded, such as in a look up table, using BIOS FW data 196. It is noted that BIOS FW ECC 194 may store multiple copies of ECC for BIOS FW compressed 192 and in case of corruption of BIOS FW ECC 194, the multiple copies could be used to overcome a bit error in any one copy, such as by voting for a majority when three copies are used. Upon a subsequent reboot, the error bits stored in BIOS FW data 196 may be used to correct BIOS FW compressed 192 without having to execute the ECC error correction procedure, which may be time consuming, and therefore, undesirable, to users of information handling system 100. Further details and aspects of automatic correction of nonvolatile memory in information handling systems are disclosed in the following description.

Figure 2:
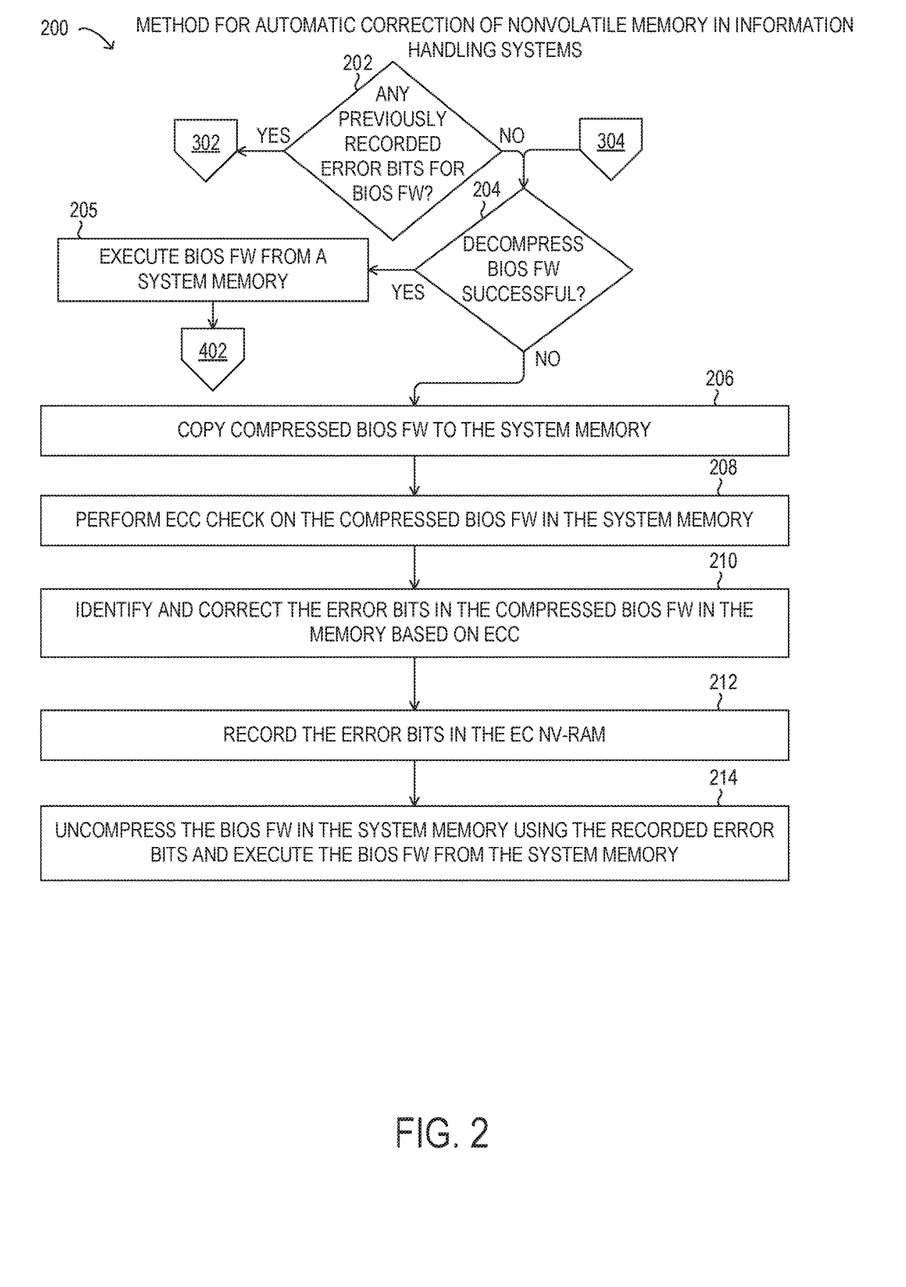
FIG. 2 is a flow chart of selected elements of an embodiment of a method for automatic correction of a nonvolatile memory in information handling systems.

Referring now to FIG. 2, a flow chart of selected elements of an embodiment of a method 200 for automatic correction of nonvolatile memory in information handling systems, as described herein, is depicted in flowchart form. Method 200 may be performed using information handling system 100, by EC firmware 186 of embedded controller 180 executing on EC processor 182. It is noted that certain operations described in method 200 may be optional or may be rearranged in different embodiments.

Method 200 may begin by powering on the information handling system and, at step 202, a decision may be made whether any previously recorded error bits for the BIOS firmware (FW) are present. At step 202, BIOS FW data 196 may be checked for recorded error bits, such as in a lookup table of error bits for BIOS FW compressed 192. When recorded error bits are found in step 202, the result of step 202 is YES and method 200 may proceed to step 302 (see FIG. 3). When no recorded error bits are found in step 202, the result of step 202 is NO and at step 204, a decision may be made whether decompressing the BIOS firmware was successful. It is noted that step 204 may be reached after step 304 (see FIG. 3). At step 204, BIOS FW compressed 192 may be subject to an attempted decompression and the result of the attempted decompression may be the result of step 204. When the BIOS firmware was successfully decompressed, such as to a system memory, the result of step 204 is YES and method 200 may proceed to step 205 by executing the BIOS firmware from the system memory. It is noted that after step 205, method 200 may proceed to step 402 of method 400 (See FIG. 4). When the BIOS firmware was not successfully decompressed the result of step 204 is NO, and method 200 may proceed to step 206 by copying the compressed BIOS firmware to the system memory. At step 208, an ECC check may be performed on the compressed BIOS firmware in the system memory. At step 210, the error bits in the compressed BIOS firmware may be identified and corrected in the system memory, based on ECC. It is noted that the ECC check performed at step 208 may be a time-intensive operation for which a user of the information handling system must wait to proceed. At step 212, the error bits are recorded in EC NV-RAM 184. For example, at step 212, the error bits may be recorded in a lookup table in BIOS FW data 196. At step 214, the BIOS firmware may be decompressed in the system memory using the recorded error bits and the BIOS firmware may be executed from the system memory.

Figure 3:
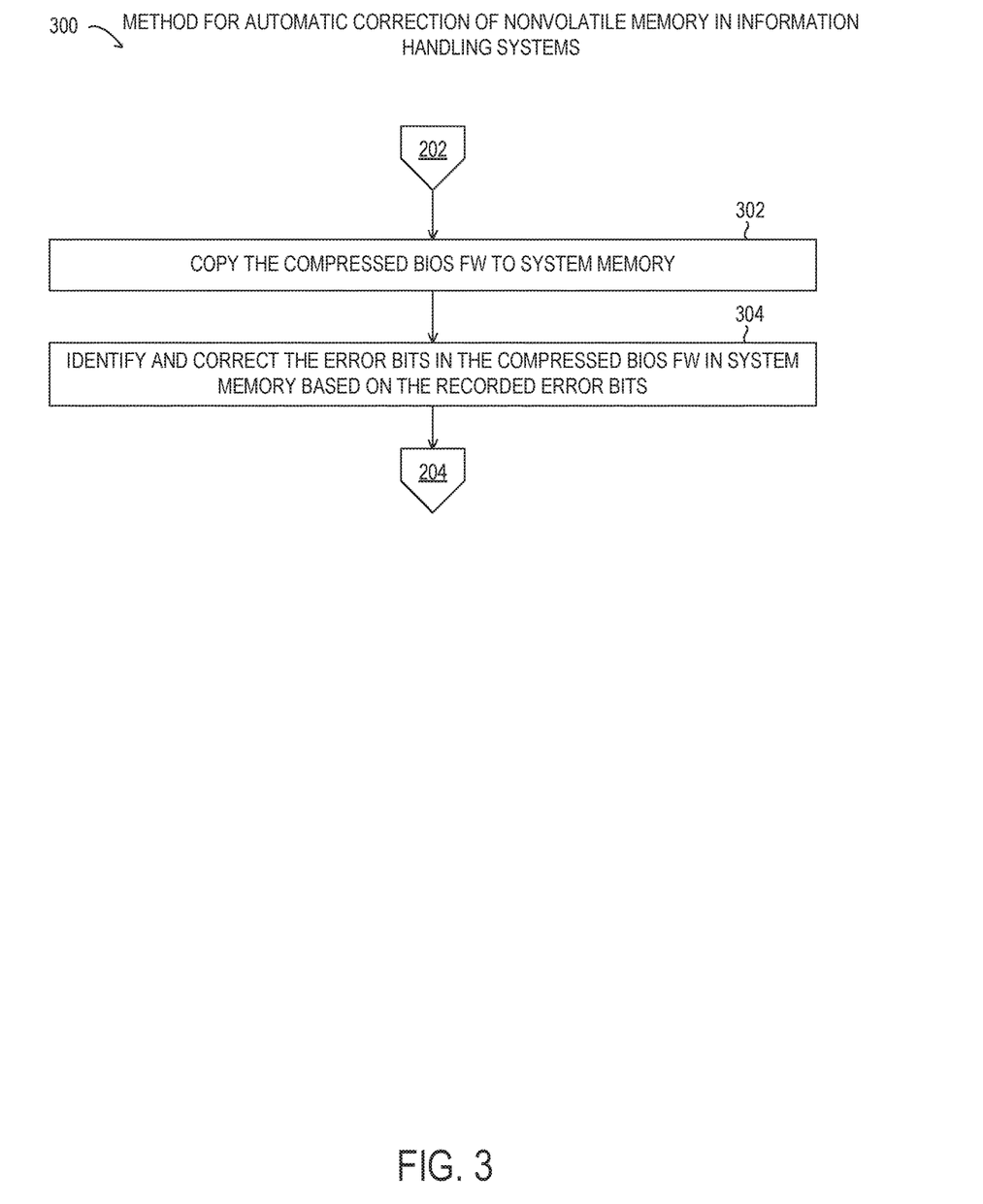
FIG. 3 is a flow chart of selected elements of an embodiment of a method for automatic correction of a nonvolatile memory in information handling systems.

Referring now to FIG. 3, a flow chart of selected elements of an embodiment of a method 300 for automatic correction of nonvolatile memory in information handling systems, as described herein, is depicted in flowchart form. Method 300 may be performed using information handling system 100, by EC firmware 186 of embedded controller 180 executing on EC processor 182. It is noted that certain operations described in method 300 may be optional or may be rearranged in different embodiments.

Method 300 may begin after step 202 in method 200 described above with respect to FIG. 2. At step 302, the compressed BIOS firmware may be copied to system memory. At step 304, the error bits in the compressed BIOS firmware may be identified and corrected based on the recorded error bits. The recorded error bits may be stored in a lookup table in BIOS FW data 196. It is noted that the correction of the error bits in BIOS FW compressed 192 using the recorded error bits may be substantially faster than the ECC check performed in steps 208 and 210, for example. After step 304, method 300 may return to step 204 in method 200.

Figure 4:
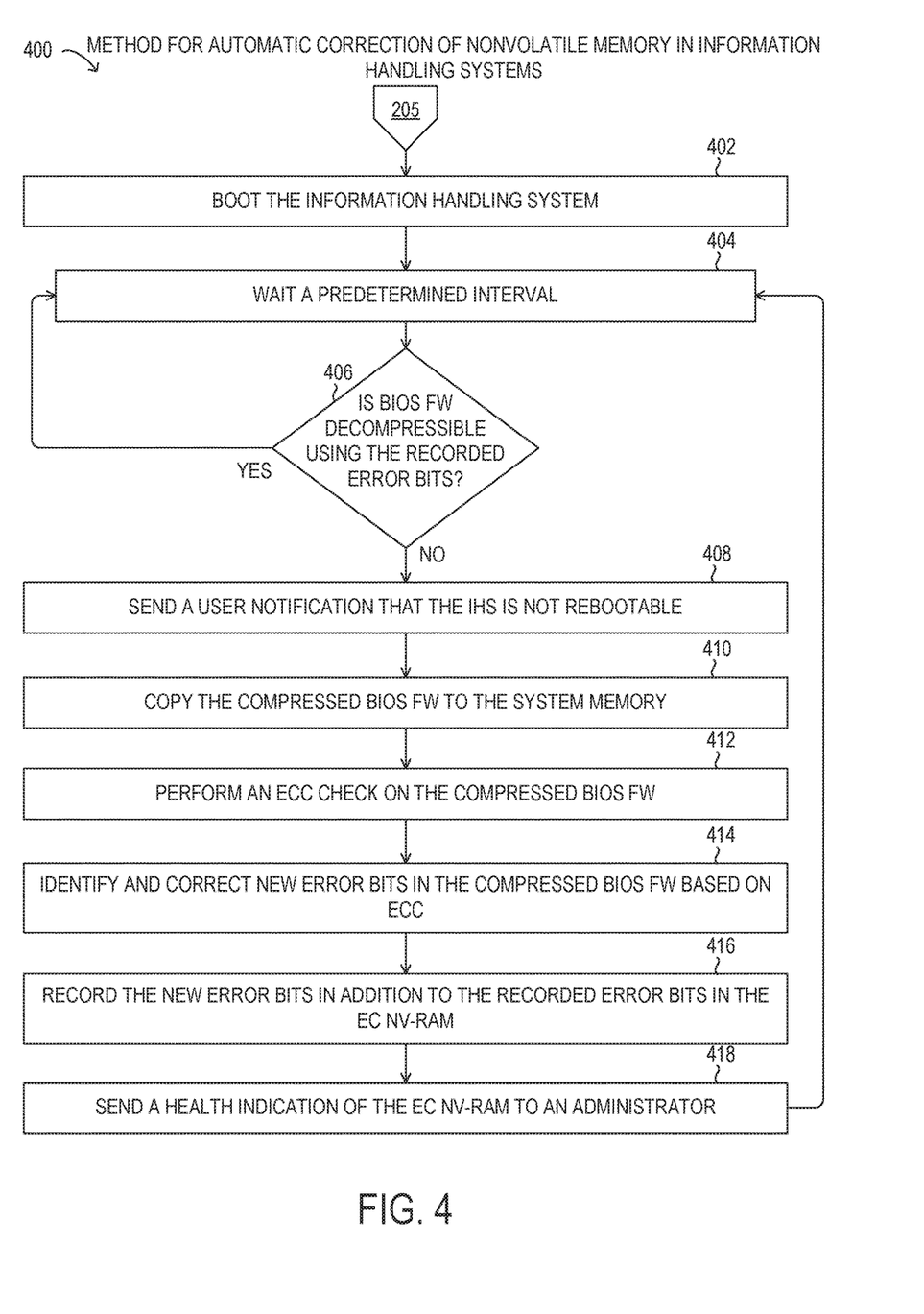
FIG. 4 is a flow chart of selected elements of an embodiment of a method for automatic correction of a nonvolatile memory in information handling systems.

Referring now to FIG. 4, a flow chart of selected elements of an embodiment of a method 400 for automatic correction of nonvolatile memory in information handling systems, as described herein, is depicted in flowchart form. Method 400 may be performed using information handling system 100, by EC firmware 186 of embedded controller 180 executing on EC processor 182. It is noted that certain operations described in method 400 may be optional or may be rearranged in different embodiments.

Method 400 may begin after step 205 in method 200 described above. At step 402, the information handling system may be booted. Booting the information handling system may include loading and executing operating system 132, including hardware drivers. At step 404, a predetermined interval may be waited. At step 406 a decision may be made whether the BIOS firmware is decompressible using the recorded error bits. When the BIOS firmware is decompressible using the recorded error bits, the result of step 406 is YES and method 400 may loop back to step 404. When the BIOS firmware is not decompressible using the recorded error bits, the result of step 406 is NO and method 400 may advance to step 408 by sending a user notification that the information handling system is not rebootable. At step 410, the compressed BIOS firmware may be copied to the system memory. At step 412, an ECC check may be performed on the compressed BIOS firmware. It is noted that step 412 may be a background operation while the information handling system is being operated for other purposed by the user, and therefore, may not consume the time of the user. At step 414, new error bits may be identified and corrected in the compressed BIOS firmware based on ECC. At step 416, the new error bits may be recorded in addition to the recorded error bits in EC NV-RAM 184. At step 418, a health indication of EC NV-RAM 184 may be sent to an administrator. The health indication in step 418 may include some indication of the number of error bits or frequency of failure of EC NV-RAM 184.

As disclosed herein, a method for automatic correction of nonvolatile memory in information handling systems includes storing ECC data for a compressed BIOS firmware. The ECC data are used to identify and correct error bits in the compressed BIOS firmware. The discovered error bits may be recorded in the nonvolatile memory and accessed for a faster correction method for the compressed BIOS firmware than using the ECC data on subsequent attempts.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for correcting nonvolatile memories in information handling systems, the method comprising:
 determining whether a compressed version of a basic input/output system (BIOS) firmware stored on a nonvolatile memory of an information handling system is decompressible;
 if the compressed version of the BIOS firmware is not decompressible:
  copying the compressed version of the BIOS firmware to a system memory of the information handling system;
  using error correction codes (ECC) stored on the nonvolatile memory for the compressed version of the BIOS firmware, identifying and correcting first error bits for the compressed version of the BIOS firmware in the compressed version of the BIOS firmware in the system memory;
  recording the first error bits for the compressed version of the BIOS firmware identified from the compressed version of the BIOS firmware in a recorded set of error bits at the nonvolatile memory; and
  using the first error bits for the compressed version of the BIOS firmware identified, decompressing the compressed version of the BIOS firmware in the system memory; and
 prior to determining whether the compressed version of the BIOS firmware is decompressible:
  determining whether a recorded set of error bits for the compressed version of the BIOS firmware is recorded at the nonvolatile memory; and
  if the recorded set of error bits for the compressed version of the BIOS firmware is recorded at the nonvolatile memory:
   copying the compressed version of the BIOS firmware to the system memory; and using the recorded set of error bits for the compressed version of the BIOS firmware recorded at the nonvolatile memory, identifying and correcting the first error bits for the compressed version of the BIOS firmware in the compressed version of the BIOS firmware in the system memory.

2. The method of claim 1, wherein the recorded set of error bits recorded at the nonvolatile memory comprises the first error bits.

3. The method of claim 1, further comprising:
if the compressed version of the BIOS firmware is decompressible:
decompressing, by an embedded controller processor of the information handling system, the compressed version of the BIOS firmware;
executing, by a primary processor of the information handling system, an uncompressed version of the BIOS firmware from the system memory; and
booting, by the primary processor, the information handling system.

4. The method of claim 3, further comprising, while the information handling system is operating after the booting:
determining whether the compressed version of the BIOS firmware is decompressible using the first error bits of the recorded set of error bits for the compressed version of the BIOS firmware;
if the compressed version of the BIOS firmware is not decompressible using the first error bits of the recorded set of error bits for the compressed version of the BIOS firmware:
sending a notification to a user of the information handling system that the information handling system is not rebootable;
copying the compressed version of the BIOS firmware to the system memory;
using the ECC, identifying and correcting second error bits for the compressed version of the BIOS firmware in the compressed version of the BIOS firmware in the system memory; and
recording the second error bits for the compressed version of the BIOS firmware in addition to first error bits of the recorded set of error bits for the compressed version of the BIOS firmware in the recorded set of error bits at the nonvolatile memory.

5. The method of claim 1, wherein an uncompressed version of the BIOS firmware complies with a Unified Extensible Firmware Interface (UEFI) standard.

6. The method of claim 5, wherein the uncompressed version of the BIOS firmware includes code to execute a driver execution environment (DXE) and a system management mode (SMM).

7. An embedded controller (EC) for correcting nonvolatile memories in information handling systems, the embedded controller comprising:
an EC processor in an information handling system including a primary processor different from the EC processor, the EC processor having access to a nonvolatile memory storing instructions executable to:
determine whether a compressed version of a basic input/output system (BIOS) firmware stored on the nonvolatile memory is decompressible;
if the compressed version of the BIOS firmware is not decompressible:
copying the compressed version of the BIOS firmware to a system memory of the information handling system;

using error correction codes (ECC) stored on the nonvolatile memory for the compressed version of the BIOS firmware, identify and correct first error bits for the compressed version of the BIOS firmware in the BIOS firmware in the system memory;
record the first error bits for the compressed version of the BIOS firmware identified from the compressed version of the BIOS firmware in a recorded set of error bits at the nonvolatile memory; and
using the first error bits for the compressed version of the BIOS firmware identified, decompress the compressed version of the BIOS firmware in the system memory; and
prior to determining whether the compressed version of the BIOS firmware is decompressible:
determine whether a recorded set of error bits for the compressed version of the BIOS firmware is recorded at the nonvolatile memory; and
if the recorded set of error bits for the compressed version of the BIOS firmware is recorded at the nonvolatile memory:
copy the compressed version of the BIOS firmware to the system memory; and
using the recorded set of error bits for the compressed version of the BIOS firmware recorded at the nonvolatile memory, identify and correct the first error bits for the compressed version of the BIOS firmware in the compressed version of the BIOS firmware in the system memory.

8. The embedded controller of claim 7, wherein the recorded set of error bits recorded at the nonvolatile memory comprises the first error bits.

9. The embedded controller of claim 7, further comprising instructions to:
if the compressed version of the BIOS firmware is decompressible:
decompress the compressed version of the BIOS firmware; and
execute an uncompressed version of the BIOS firmware from the system memory, wherein the primary processor having access to the nonvolatile memory further comprising instructions to:
boot the information handling system.

10. The embedded controller of claim 9, further comprising instructions to, while the information handling system is operating after booting:
determine whether the compressed version of the BIOS firmware is decompressible using the first error bits of the recorded set of error bits for the compressed version of the BIOS firmware;
if the compressed version of the BIOS firmware is not decompressible using the first error bits of the recorded set of error bits for the compressed version of the BIOS firmware:
send a notification to a user of the information handling system that the information handling system is not rebootable;
copy the compressed version of the BIOS firmware to the system memory;
using the ECC, identify and correct second error bits for the compressed version of the BIOS firmware in the compressed version of the BIOS firmware in the system memory; and
record the second error bits for the compressed version of the BIOS firmware in addition to the first error bits of the recorded set of error bits for the compressed version of the BIOS firmware in the recorded set of error bits at the nonvolatile memory.

11. The embedded controller of claim 7, wherein an uncompressed version of the BIOS firmware complies with a Unified Extensible Firmware Interface (UEFI) standard.

12. The embedded controller of claim 11, wherein the uncompressed version of the BIOS firmware includes code to execute a driver execution environment (DXE) and a system management mode (SMM).

13. A non-transitory computer readable nonvolatile memory storing instructions executable by an embedded controller (EC) processor to:
  determine, for an information handling system having a primary processor different from the EC processor, whether a compressed version of a basic input/output system (BIOS) firmware stored on the nonvolatile memory is decompressible;
  if the compressed version of the BIOS firmware is not decompressible:
    copying the compressed version of the BIOS firmware to a system memory of the information handling system;
    using error correction codes (ECC) stored on the nonvolatile memory for the compressed version of the BIOS firmware, identify and correct first error bits for the compressed version of the BIOS firmware in the compressed version of the BIOS firmware in the system memory;
    record the first error bits for the compressed version of the BIOS firmware identified from the compressed version of the BIOS firmware in a recorded set of error bits at the nonvolatile memory; and
    using the first error bits for the compressed version of the BIOS firmware identified, decompress the compressed version of the BIOS firmware in the system memory; and
  prior to determining whether the compressed version of the BIOS firmware is decompressible:
    determine whether a recorded set of error bits for the compressed version of the BIOS firmware is recorded at the nonvolatile memory; and
    if the recorded set of error bits for the compressed version of the BIOS firmware is recorded at the nonvolatile memory:
      copy the compressed version of the BIOS firmware to the system memory; and
      using the recorded set of error bits for the compressed version of the BIOS firmware recorded at the nonvolatile memory, identify and correct the first error bits for the compressed version of the BIOS firmware in the compressed version of the BIOS firmware in the system memory.

14. The nonvolatile memory of claim 13, wherein the recorded set of error bits recorded at the nonvolatile memory comprises the first error bits.

15. The nonvolatile memory of claim 13, further comprising instructions to:
  if the compressed version of the BIOS firmware is decompressible:
    decompress the compressed version of the BIOS firmware; and
    execute an uncompressed version of the BIOS firmware from the system memory, wherein the primary processor having access to the nonvolatile memory further comprising instructions to:
      boot the information handling system.

16. The nonvolatile memory of claim 15, further comprising instructions to, while the information handling system is operating after booting:
  determine whether the compressed version of the BIOS firmware is decompressible using the first error bits of the recorded set of error bits for the compressed version of the BIOS firmware;
  if the compressed version of the BIOS firmware is not decompressible using the first error bits of the recorded set of error bits for the compressed version of the BIOS firmware:
    send a notification to a user of the information handling system that the information handling system is not rebootable;
    copy the compressed version of the BIOS firmware to the system memory;
    using the ECC, identify and correct second error bits for the compressed version of the BIOS firmware in the compressed version of the BIOS firmware in the system memory; and
    record the second error bits for the compressed version of the BIOS firmware in addition to the first error bits of the recorded set of error bits for the compressed version of the BIOS firmware in the recorded set of error bits at the nonvolatile memory.

17. The nonvolatile memory of claim 13, wherein an uncompressed version of the BIOS firmware complies with a Unified Extensible Firmware Interface (UEFI) standard.

18. The nonvolatile memory of claim 17, wherein the uncompressed version of the BIOS firmware includes code to execute a driver execution environment (DXE) and a system management mode (SMM).

* * * * *